United States Patent
Delin et al.

(10) Patent No.: US 7,551,122 B1
(45) Date of Patent: Jun. 23, 2009

(54) RADAR LEVEL GAUGE SYSTEM AND METHOD PROVIDING A SIGNAL INDICATIVE OF PROCESS RELIABILITY

(75) Inventors: Håkan Delin, Linköping (SE); Per Karlsson, Göteborg (SE)

(73) Assignee: Rosemount Tank Radar AB, Gothenburg (SE)

( * ) Notice: Subject to any disclaimer, the term of this patent is extended or adjusted under 35 U.S.C. 154(b) by 18 days.

(21) Appl. No.: 11/951,621

(22) Filed: Dec. 6, 2007

(51) Int. Cl.
*G01S 13/08* (2006.01)
(52) U.S. Cl. .......................... 342/124; 342/90; 342/91
(58) Field of Classification Search ................ 342/124, 342/90, 91, 175
See application file for complete search history.

(56) References Cited

U.S. PATENT DOCUMENTS

| | | | |
|---|---|---|---|
| 4,044,355 A * | 8/1977 | Edvardsson | 342/124 |
| 5,504,490 A * | 4/1996 | Brendle et al. | 342/118 |
| 5,689,265 A * | 11/1997 | Otto et al. | 342/124 |
| 6,078,280 A | 6/2000 | Perdue et al. | 342/124 |
| 6,198,424 B1 * | 3/2001 | Diede et al. | 342/22 |
| 6,295,018 B1 | 9/2001 | Diede et al. | 342/124 |
| 6,559,657 B1 | 5/2003 | McCarthy et al. | 324/642 |
| 6,690,320 B2 * | 2/2004 | Benway et al. | 342/124 |
| 6,759,976 B1 * | 7/2004 | Edvardsson | 342/124 |
| 7,265,558 B1 * | 9/2007 | Penndal et al. | 324/637 |
| 2004/0257269 A1 * | 12/2004 | Laun | 342/124 |
| 2006/0052954 A1 | 3/2006 | Welle et al. | 702/55 |
| 2008/0074309 A1 * | 3/2008 | Nilsson | 342/124 |

FOREIGN PATENT DOCUMENTS

| | | |
|---|---|---|
| DE | 19824267 | 12/1999 |
| DE | 102004052110 | 5/2006 |
| JP | 03255972 A * | 11/1991 |
| WO | WO 2005/062001 | 7/2005 |

* cited by examiner

Primary Examiner—John B Sotomayor
(74) Attorney, Agent, or Firm—Westman, Champlin & Kelly, P.A

(57) ABSTRACT

A method for determination of a filling level of a product contained in a tank, comprising the steps of generating and transmitting an electromagnetic signal; propagating the transmitted electromagnetic signal towards the product in the tank; receiving echo signals resulting from reflections at impedance transitions encountered by the transmitted electromagnetic signal; classifying one of the echo signals as a surface echo signal resulting from reflection at a surface of the product inside the tank; evaluating an additional echo signal; providing, if an amplitude of the additional echo signal is greater than a predetermined disturbance echo threshold, a signal indicative thereof; and determining the filling level based on the surface echo signal.

40 Claims, 8 Drawing Sheets

RADAR LEVEL GAUGE SYSTEM AND METHOD PROVIDING A SIGNAL INDICATIVE OF PROCESS RELIABILITY

TECHNICAL FIELD OF THE INVENTION

The present invention relates to a radar level gauge system, for level determination of a product contained in a tank, and to a method for achieving such a filling level determination.

TECHNICAL BACKGROUND

Radar level gauge systems are in wide use for measuring process variables of a product contained in a tank, such as filling level, temperature, pressure etc. Radar level gauging is generally performed either by means of non-contact measurement, whereby electromagnetic signals are radiated towards the product contained in the tank, or by means of contact measurement, often referred to as guided wave radar (GWR), whereby electromagnetic signals are guided towards and into the product by a probe acting as a waveguide. The probe is generally arranged vertically from top to bottom of the tank. The electromagnetic signals are subsequently reflected at the surface of the product, and the reflected signals are received by a receiver or transceiver comprised in the radar level gauge system. Based on the transmitted and reflected signals, the distance to the surface of the product can be determined.

More particularly, the distance to the surface of the product is generally determined based on the time between transmission of an electromagnetic signal and receipt of the reflection thereof in the interface between the atmosphere in the tank and the product contained therein. In order to determine the actual filling level of the product, the distance from a reference position to the surface is determined based on the above-mentioned time (the so-called time-of-flight) and the propagation velocity along the probe of the electromagnetic signals.

However, the electromagnetic signal transmitted by the transceiver along the probe is typically not only reflected at the impedance transition constituted by the interface between atmosphere and surface, but at several other impedance transitions along the probe. Such impedance transitions may, for example, result from product residue that may have adhered to the probe as the filling level of the product changes inside the tank.

There is therefore a risk that the system attempts to determine the filling level based on an erroneous reflected signal.

Moreover, the reflected signal resulting from reflection at the surface of the product may under some conditions be intermittent, which may result in an unreliable filling level determination.

In order to improve the reliability of the filling level determination, US 2006/0052954 and DE 10 2004 052 110 disclose methods and systems for determining which received echo signals are surface echo signals resulting from reflection at the surface of the product in the tank, and which received echo signals are parasitic echo signals. According to each of the methods disclosed in these documents, the received echo signals are classified into surface echo candidates and parasitic echo candidates based on their respective movement over time—non-stationary echoes are classified as surface echoes, while stationary echoes are classified as parasitic echoes.

Neither of the systems and methods disclosed in the above documents provide any indication of the reliability of the level determination.

SUMMARY OF THE INVENTION

In view of the above-mentioned and other drawbacks of the prior art, a general object of the present invention is to provide an improved radar level gauge system and method, and in particular a radar level gauge system and method capable of providing an indication of the reliability of the level determination performed by the system.

According to a first aspect of the present invention, these and other objects are achieved through a method for determination of a filling level of a product contained in a tank, comprising the steps of generating and transmitting an electromagnetic signal; propagating the transmitted electromagnetic signal towards the product in the tank; receiving echo signals resulting from reflections at impedance transitions encountered by the transmitted electromagnetic signal; classifying one of the echo signals as a surface echo signal resulting from reflection at a surface of the product inside the tank; evaluating an additional echo signal; providing, if an amplitude of the additional echo signal is greater than a predetermined disturbance echo threshold, a signal indicative thereof and determining the filling level based on the surface echo signal.

It should be noted that none of the methods according to the various aspects of the present invention is limited to performing the steps thereof in any particular order.

The tank may be any container or vessel capable of containing a product, and may be metallic, or partly or completely non-metallic, open, semi-open, or closed.

The present invention is based on the realization that the reliability of filling level measurements can be improved by identifying and indicating sources of disturbance echoes at an early stage, preferably before a disturbance echo signal is in the same order of magnitude as the echo signal from the surface of the product.

Through the provision of a signal, based on which conclusions regarding the reliability of the process may be drawn, the operator of the radar level gauge system can be given an early warning and gets the opportunity to decide appropriate action for ensuring the continued reliability of the filling level determination.

The methods according to the various aspects of the present invention are especially suitable for a radar level gauge system of guided wave radar (GWR) type in which the transmitted electromagnetic signal and its reflections are guided by a probe that is connected to the transceiver and arranged to extend towards and into the product in the tank. It should, however, be understood that the present invention may also be useful in non-contact type radar level gauge systems in which a transmitted electromagnetic signal is radiated towards the product using an antenna, such as a horn antenna, an array antenna etc.

In the context of the present application, the "probe" is a waveguide designed for guiding electromagnetic signals. Several types of probes, for example single-line (Goubau-type), and twin-line probes may be used. The probes may be essentially rigid or flexible and they may be made from metal, such as stainless steel, plastic, such as PTFE, or a combination thereof.

In the case of a GWR-system, action taken by the operator in response to a signal provided by the system may, for example, include cleaning the probe and identifying a "lump" echo signal as such and removing it from the echo profile prior to determination of the filling level.

The early warning system of the present aspect of the invention will reduce the risk of erroneously classifying an echo signal resulting from reflection at probe contamination, such as product residue accumulated somewhere along the probe, as the surface echo signal.

For determining whether to provide a signal to indicate possible probe contamination, the additional echo signal that is evaluated may advantageously result from reflection at an impedance transition located above the position associated with the surface echo signal, that is, above what is presently believed to be the surface of the product in the tank.

Alternatively, all additional echo signals may be evaluated, but only the presence of such an echo signal both having an amplitude greater than the probe contamination threshold and resulting from reflection at an impedance transition located above the position associated with the surface echo signal lead to the provision of the above-mentioned signal indicating possible probe contamination.

The classification of one of the received echo signals as a surface echo signal may, for example, be performed by comparing the received echo signals with a surface echo threshold and classifying the echo signal that has an amplitude greater than the surface echo threshold and that is closest to the tank ceiling as the surface echo signal. Further methods exist, such as classifying the strongest echo signal as the surface echo signal, or combining several properties of the echo signal, such as the stability of the echo signal with regard to its position and/or amplitude and/or shape, the speed of the echo signal etc.

The surface echo threshold may, for example, be determined based on the relative permittivity of the product in the tank or, if this parameter is unknown, based on the signal-to-noise ratio of the received signals. In the former case, the surface echo threshold may, for example, be set to about 50% of the theoretically determined amplitude of an electromagnetic signal reflected by the surface of the product, and in the latter case be set significantly higher than the noise level but low enough not to miss an electromagnetic signal reflected by the surface of any product that could be presumed to be contained in the tank.

In order to ensure a desired minimum process margin, the probe contamination threshold may be determined as a suitably small fraction of the surface echo threshold. Depending to the desired process margin, the probe contamination threshold can thus be set in such a way that echo signals resulting from reflections at other impedance transitions along the probe than the surface can be detected and identified as such in good time before there is a risk of erroneously classifying any such additional echo signal as the surface echo signal.

The above-mentioned probe contamination threshold may be a simple amplitude level which is the same along the entire length of the probe. Alternatively, however, the probe contamination threshold may be a baseline, that is, an echo profile which is related to a signal returned by an uncontaminated probe. This signal may be acquired during production or, preferably, following installation in an empty tank. Hereby, all other possible sources of additional echo signals can be taken into account in such a way that they do not contribute to the identification of echo signals resulting from probe contamination.

It should be pointed out that the additional echo signals that are of main interest for enabling indication of possible probe contamination are additional echo signals having the same sign as the surface echo signal.

It should be understood that "the sign" of a received echo signal is a matter of definition. In the context of the present application, a received signal resulting from reflection of the transmitted electromagnetic signal by an impedance transition to a lower impedance (as experienced by the transmitted electromagnetic signal) has the same sign as the transmitted signal, while a received signal resulting from reflection by an impedance transition to a higher impedance (as experienced by the transmitted electromagnetic signal) has the opposite sign.

If, for instance, the transmitted electromagnetic signal is positive (equivalent to having a higher amplitude than an offset value), then a positive echo signal has the same sign while a negative (equivalent to having a lower amplitude than an offset value) echo signal has the opposite sign with respect to the transmitted signal.

In other words, if the surface echo signal has a positive peak, which is typically the case at least for an air/product interface (for a positive transmitted signal), the disturbance echo threshold/probe contamination threshold should have a positive value. In the case discussed above when the probe contamination threshold is related to the baseline echo profile of an uncontaminated probe, the probe contamination threshold should consequently have a more positive value than the baseline.

Although very infrequently, situations may occur in which the wrong echo signal is classified as the surface echo signal. In such situations a correct filling level determination can obviously not be performed.

In order to enable efficient handling of such rare situations, the method according to the present aspect of the invention may further comprise the step of determining a speed of an impedance transition, based on echo signals that result from reflection at the impedance transition, and are received at different points in time.

From such speed data associated with the impedance transition that has been classified as being the surface as well as other impedance transitions, it can be determined whether the currently classified surface echo signal in fact results from reflection at another impedance transition, such as product residue adhered to the probe.

More particularly, such a determination can be carried out based on the relatively stationary character of product residue adhered to the probe.

In principle, the possible occurrence of a measurement error could thus be indicated based on a simple comparison between the determined respective speeds of the surface echo signal believed to result from reflection by the surface of the product—the "surface candidate"—and any additional impedance transition.

To increase the relevance of a signal for enabling indication of a measurement error, such a signal may advantageously only be provided in case the speed of the "surface candidate" is lower than a small value, say $10^{-5}$ m/s, and the speed of another impedance transition, which may be believed to be product residue adhered to the probe, is considerably higher than the above-mentioned small value, say ten or twenty times $10^{-5}$ m/s=$1$-$2 \times 10^{-4}$ m/s. To assure that the above-mentioned signal is not erroneously provided due to, for example, multiple reflections, it may be advantageous to provide the signal only if the speed of the additional impedance transition is even higher, such as higher than fifty times the small value $10^{-5}$ m/s=$5 \times 10^{-4}$ m/s.

Hereby, incorrect indication of measurement error due to the occurrence of, for example, multiple reflections or echo signals picked up from impedance transitions located below the surface, can be avoided.

According to a second aspect of the present invention, the above-mentioned and other objects are achieved through a radar level gauge system, for determination of a filling level of a product contained in a tank, the radar level gauge system comprising a transceiver for generating, transmitting and receiving electromagnetic signals; a propagation device connected to the transceiver and arranged to propagate a transmitted electromagnetic signal towards the product inside the tank, and to return echo signals resulting from reflections at impedance transitions encountered by the transmitted signal back to the transceiver; and processing circuitry connected to the transceiver and comprising: a signal classifier for classifying one of the echo signals as a surface echo signal resulting from reflection at a surface of the product inside the tank; a comparator for comparing an amplitude of an additional echo signal with a disturbance echo threshold; a signal generator for providing, if the amplitude is greater than the disturbance echo threshold, a signal indicative thereof; and determination circuitry for determining the filling level based on the surface echo signal.

The "transceiver" may be one functional unit capable of transmitting and receiving electromagnetic signals, or may be a system comprising separate transmitter and receiver units.

The "propagation device" may be any device capable of propagating electromagnetic signals, including transmission line probes and various types of antennas, such as horn antennas, array antennas etc.

It should, furthermore, be noted that any one or several of the signal classifier, the comparator, the signal generator and the determination circuitry comprised in the processing circuitry may by provided as either of a separate physical component, separate hardware blocks within a single component, or software executed by one or several microprocessors.

According to one embodiment, the radar level gauge system according to the present aspect of the invention may further comprise storage means for storing position data for an impedance transition based on echo signals that result from reflection at the impedance transition, and are received at different points in time, thereby enabling determination of a speed of the impedance transition.

Further embodiments of, and effects obtained through this second aspect of the present invention are largely analogous to those described above for the first aspect of the invention.

According to a third aspect of the present invention, the above-mentioned and other objects are achieved through a method for determination of a filling level of a product contained in a tank, comprising the steps of generating and transmitting an electromagnetic signal using a transceiver; propagating the transmitted electromagnetic signal towards the product in the tank; receiving echo signals resulting from reflections at impedance transitions encountered by the transmitted electromagnetic signal; classifying one of the received echo signals as a surface echo signal resulting from reflection at a surface of the product inside the tank; evaluating an additional echo signal resulting from reflection at an additional impedance transition located above a position associated with the surface echo signal; determining a reliability measure for the determination of the filling level based on at least one property of the additional echo signal; and determining the filling level based on the surface echo signal.

The present inventors have realized that an indication of the reliability of the filling level determination can be obtained by evaluating and analyzing an echo signal additional to the surface echo signal, and that a quantitative reliability measure—a measure of the process margin or process latitude—of the level determination can be determined based on such an analysis.

The determination of the reliability measure may be based on one or several properties of the additional echo signal, such as an amplitude, a speed, a shape, a position, etc thereof. Moreover, the determination may be based on absolute and/or relative values of such properties.

According to one embodiment, the additional echo signal on which the determination of the reliability measure is based may have a larger amplitude than any other echo signal resulting from reflection at an impedance transition located above a position associated with the surface echo signal and having the same sign as the surface echo signal.

Furthermore, the reliability measure may be based on a relation between the evaluated additional echo signal and the surface echo signal.

This relation may, for example, be a relationship between amplitudes of the additional echo signal and the surface echo signal.

If the surface echo signal is very strong compared to the evaluated additional echo signal, this is an indication that the measurement is reliable and that there, at the time, is no probe contamination, such as product residue adhered to the probe, which may be mistaken for the surface of the product.

Moreover, the methods according to the various aspects of the invention can be used to check whether a newly installed radar level gauge system can be expected to behave in a reliable and robust manner. This may facilitate the configuration at system installation in a tank.

According to a further embodiment, the additional echo signal may be compared with a surface echo threshold used to classify the surface echo signal.

If there is an additional echo signal which has an amplitude of a magnitude close to the surface echo threshold and which results from reflection at an impedance transition located above the surface, there is a risk that the additional echo signal might, in a later measurement event, be erroneously classified as a surface echo signal. Based on information about the relationship between the evaluated additional echo signal and the surface echo threshold, measures can be taken to improve the reliability of the filling level determination. For example, the surface echo threshold can be adjusted (typically increased) to reduce the risk of an additional echo signal being classified as a surface echo signal.

The evaluation of the additional echo signal with respect to the surface echo threshold may be complemented with an evaluation of the surface echo signal with respect to the surface echo threshold to obtain a more complete view of the situation.

According to a fourth aspect of the present invention, the above-mentioned and other objects are achieved through a radar level gauge system, for determination of a filling level of a product contained in a tank, the radar level gauge system comprising: a transceiver for generating, transmitting and receiving electromagnetic signals; a propagation device connected to the transceiver and arranged to propagate a transmitted electromagnetic signal from the transceiver towards the product inside the tank, and to return echo signals resulting from reflections of the transmitted electromagnetic signal at impedance transitions encountered by the transmitted electromagnetic signal back to the transceiver; and processing circuitry connected to the transceiver and comprising: a signal classifier for classifying one of the echo signals as a surface echo signal resulting from reflection at a surface of the product inside the tank; an evaluator for evaluating an additional echo signal; and determination circuitry for determining a reliability measure for the determination of the filling level based on at least one property of the additional echo signal and for determining the filling level based on the surface echo signal.

It should be noted that any one or several of the signal classifier, the evaluator, and the determination circuitry comprised in the processing circuitry may by provided as either of a separate physical component, separate hardware blocks within a single component, or software executed by one or several microprocessors.

Further embodiments of, and effects obtained through this fourth aspect of the present invention are largely analogous to those described above for the third aspect of the invention.

According to a fifth aspect of the present invention, the above-mentioned and other objects are achieved through a method for determination of a filling level of a product contained in a tank, comprising the steps of: generating and transmitting an electromagnetic signal using a transceiver; propagating the transmitted electromagnetic signal towards the product in the tank; receiving echo signals resulting from reflections at impedance transitions encountered by the transmitted electromagnetic signal; classifying one of the received echo signals as a surface echo signal resulting from reflection at a surface of the product inside the tank; evaluating an additional echo signal resulting from reflection at an additional impedance transition located above a position associated with the surface echo signal; determining a reliability measure for the determination of the filling level based on a relation between the surface echo signal and the surface echo threshold; and determining the filling level based on the surface echo signal.

By comparing the surface echo signal with the surface echo threshold and providing a quantitative measure of the relation therebetween, a measure of the reliability of the filling level determination can be provided to the operator of the radar level gauging system. In particular, if the amplitude of the surface echo signal is close to the surface echo threshold, the filling level may intermittently not be provided by the system to the operator since no echo signal will then be classified as being the surface echo signal.

Further features and effects of this fifth aspect of the present invention are largely analogous to those described above in relation to the other aspects of the invention.

BRIEF DESCRIPTION OF THE DRAWINGS

These and other aspects of the present invention will now be described in more detail, with reference to the appended drawings showing a currently preferred embodiment of the invention, wherein:

FIG. 1b is a schematic illustration of the measurement electronics unit comprised in the radar level gauge system in FIG. 1a;

FIG. 1c is a schematic cross-section view of a portion of the probe comprised in the radar level gauge system in FIG. 1a;

DETAILED DESCRIPTION OF A PREFERRED EMBODIMENT OF THE INVENTION

In the present detailed description, various embodiments of the radar level gauge system according to the present invention are mainly discussed with reference to a pulsed guided wave radar (GWR) level gauge system utilizing a rigid single line (or Goubau) probe. It should be noted that this by no means limits the scope of the present invention, which is equally applicable to a non contact radar level gauge system having a propagation device in the form of an antenna known in the art, as well as GWR-systems being equipped with various other kinds of probes, such as two-lead probes, flexible probes, etc.

Furthermore, reference is mainly made to filling level determination by means of measuring the time between transmitted and reflected pulses. As is, however, evident to the person skilled in the relevant art, the teachings of the present invention are equally applicable to radar level gauge systems utilizing phase information for determining the filling level through, for example, frequency-modulated continuous wave (FMCW) measurements. When pulses modulated on a carrier are used, phase information can also be utilized.

Figure 1A:
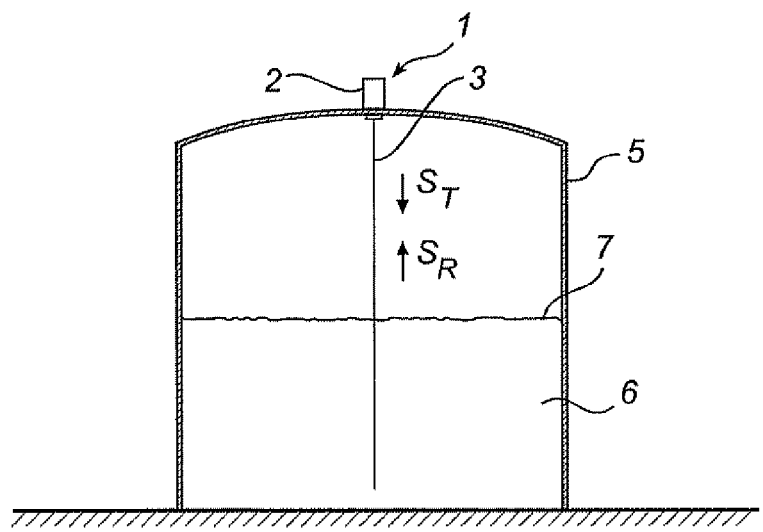
FIG. 1a schematically illustrates a radar level gauge system according to an embodiment of the present invention installed in an exemplary tank.

FIG. 1a schematically illustrates a radar level gauge system 1 according to an embodiment of the present invention, comprising a measurement electronics unit 2, and a probe 3. The radar level gauge system 1 is provided on a tank 5, which is partly filled with a product 6 to be gauged. By analyzing transmitted signals $S_T$ being guided by the probe 3 towards the surface 7 of the product 6, and reflected signals $S_R$ traveling back from the surface 7, the measurement electronics unit 2 can determine the distance between a reference position (such as the tank ceiling) and the surface 7 of the product 6, whereby the filling level can be deduced. It should be noted that, although a tank 5 containing a single product 6 is discussed herein, the distance to any material interface along the probe can be measured in a similar manner.

Figure 1B:
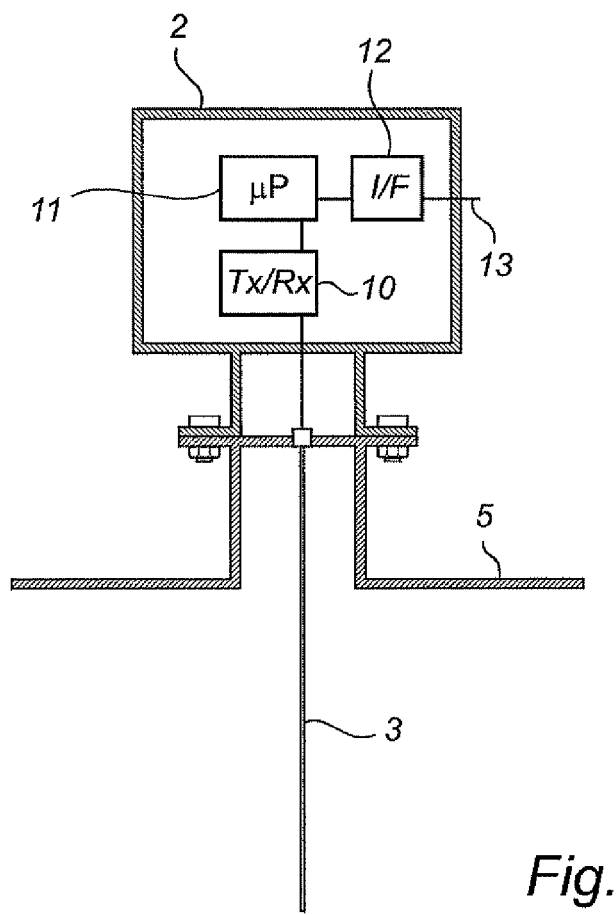

As is schematically illustrated in FIG. 1b, the electronics unit 2 comprises a transceiver 10 for transmitting and receiving electromagnetic signals, a processing unit 11, which is connected to the transceiver 10 for control of the transceiver and processing of signals received by the transceiver to determine the filling level of the product 6 in the tank 5. The processing unit 11 is, furthermore, connectable to external communication lines 13 for analog and/or digital communication via an interface 12. Moreover, although not shown in FIG. 1b, the radar level gauge system 1 is typically connectable to an external power source, or may be powered through the external communication lines 13. Alternatively, the radar level gauge system 1 may be configured to communicate wirelessly.

Figure 1C:
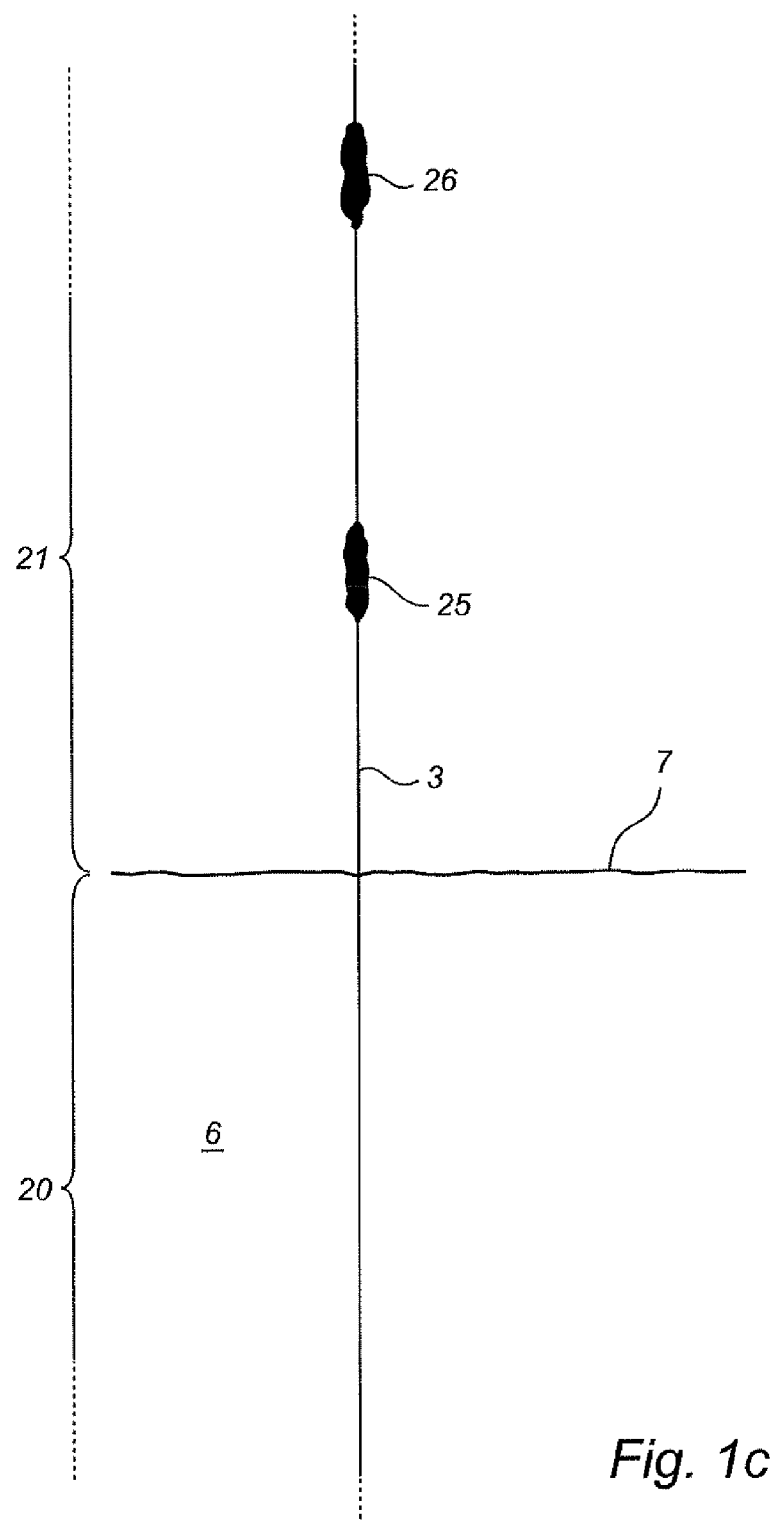

In FIG. 1c, a segment of the probe 3 comprising a submerged portion 20 and an unsubmerged portion 21 is shown. As can be seen in FIG. 1c, there are two "lumps" 25 and 26 (a lump may be a concentrated accumulation of the product 6) adhered to the probe 3 above the surface 7 of the product 6.

Depending on the properties of such lumps 25, 26, they may return an echo signal that is similar to the surface echo signal returned by the surface 7 of the product 6.

Figure 2A:
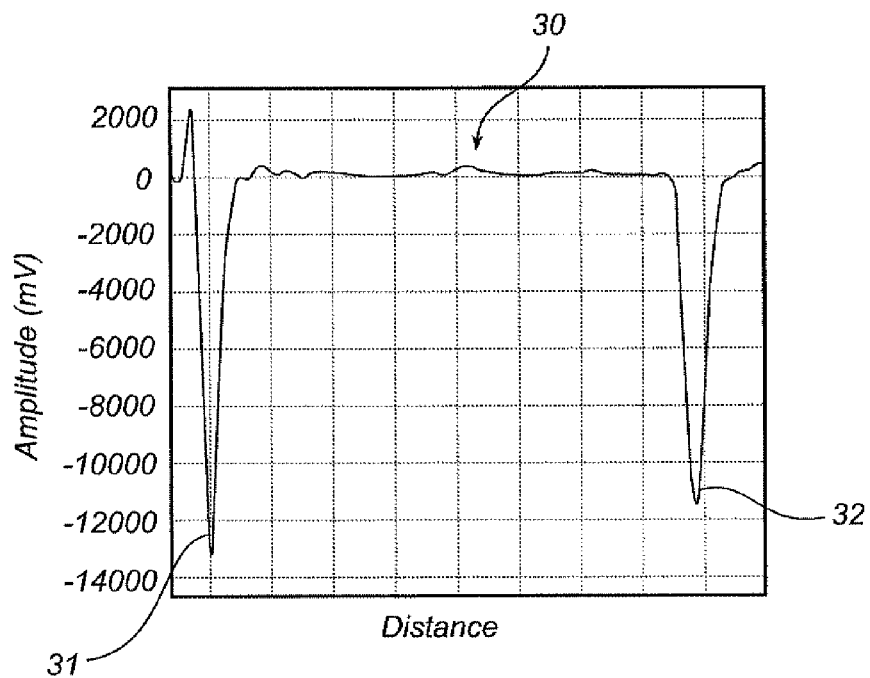
FIG. 2a schematically illustrates an exemplary echo profile obtained from a clean probe installed in a tank.
Figure 2B:
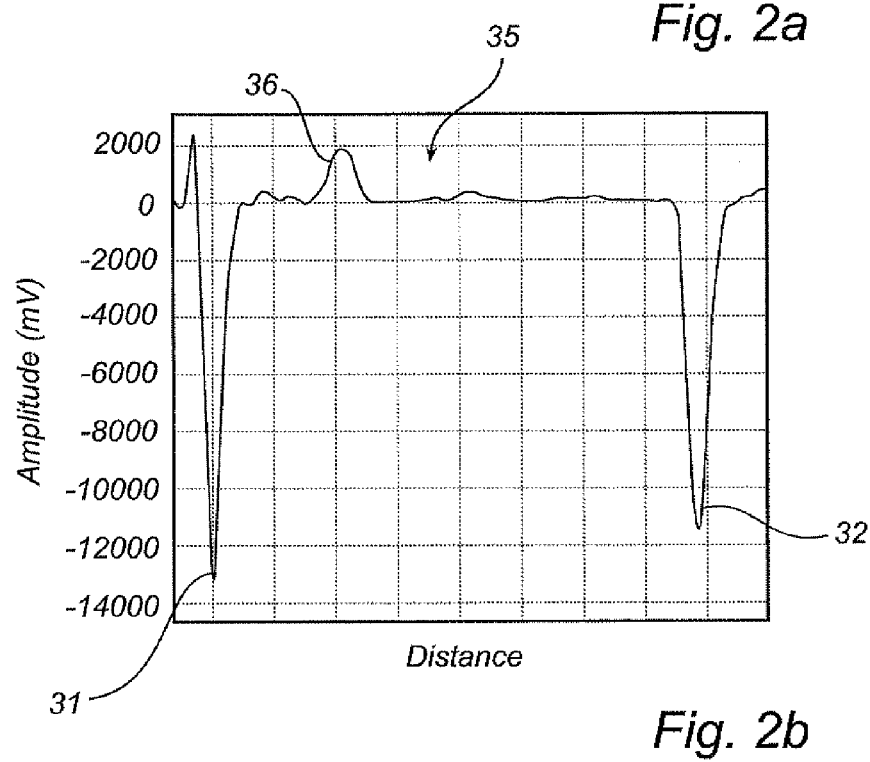
FIG. 2b schematically illustrates an exemplary echo profile including a surface echo.
Figure 2C:
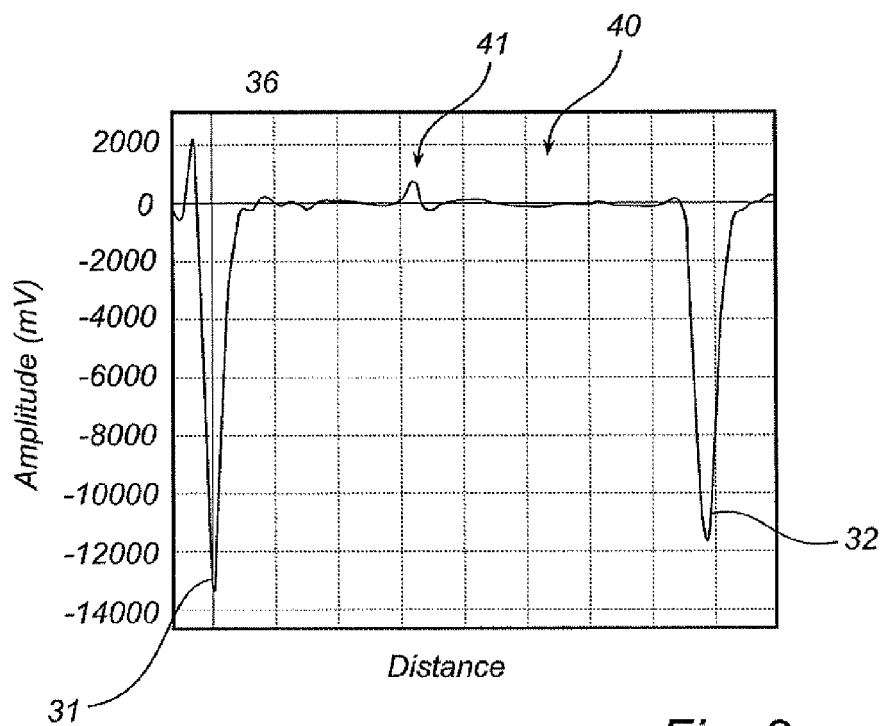
FIG. 2c schematically illustrates an exemplary echo profile including a disturbance echo.

With reference to FIGS. 2a-c, different echo profiles resulting from signals returned by the probe 3 under different conditions will now be described. It should be noted that these echo profiles are exemplary illustrations only and that, in a real situation, the electrical distance to the end of the probe would be dependent on the filling level of product in the tank, as well as of the properties—notably the permittivity—of the product.

The exemplary echo profile 30 shown in FIG. 2a results from an uncontaminated probe 3 that is installed in a tank 5. As can be seen in FIG. 2a, the echo profile 30 has first 31 and second 32 strong negative echoes. The first negative echo 31 results from reflection of the transmitted signal $S_T$ in FIG. 1a at the interface between the measurement electronics unit 2 and the probe 3, and the second negative echo 32 results from reflection at the end of the probe 3.

In FIG. 2b, another exemplary echo profile 35 is shown, comprising a further echo 36 resulting from reflection of the transmitted signals $S_T$ at the surface 7 of the product 6 in the tank 5. Note that the further echo—the surface echo 36—is positive.

Finally, in FIG. 2c, a further exemplary echo profile 40 can be seen, which has a positive echo 41 that results from reflection at a lump adhered to the probe 3.

Having now shown a number of basic echo profiles 30, 35, 40 resulting from various simple measurement conditions, a more complex, and realistic, measurement situation will be described with reference to the exemplary echo profile in FIG. 3.

Figure 3:
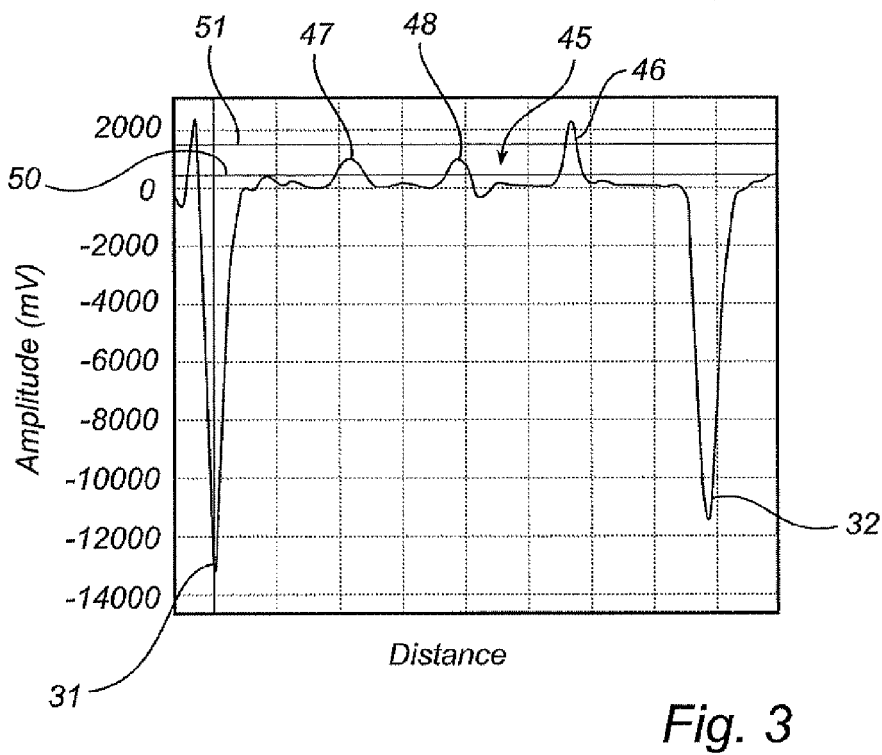
FIG. 3 schematically illustrates an exemplary echo profile including a surface echo and a number of disturbance echoes.

The echo profile 45 in FIG. 3 has, apart from the above-mentioned first 31 and second 32 negative echoes, a surface echo 46 and two lump echoes 47, 48 resulting from reflection of the transmitted signal $S_T$ at two lumps 25, 26 (in FIG. 1c) located closer to the transceiver 10 than the surface 7 of the product 6 in the tank 5.

In FIG. 3, a probe contamination threshold 50 and a surface echo threshold 51 are shown as solid lines, the surface echo threshold 51 being higher than the probe contamination threshold 50. Although both thresholds 50 and 51 are here shown as straight lines representing a constant threshold value along the entire length of the probe, either of the thresholds or both may alternatively be related to the echo profile 30 in FIG. 2a, resulting from signals returned by a clean probe which is installed in a tank but not submerged in a product.

Figure 4:
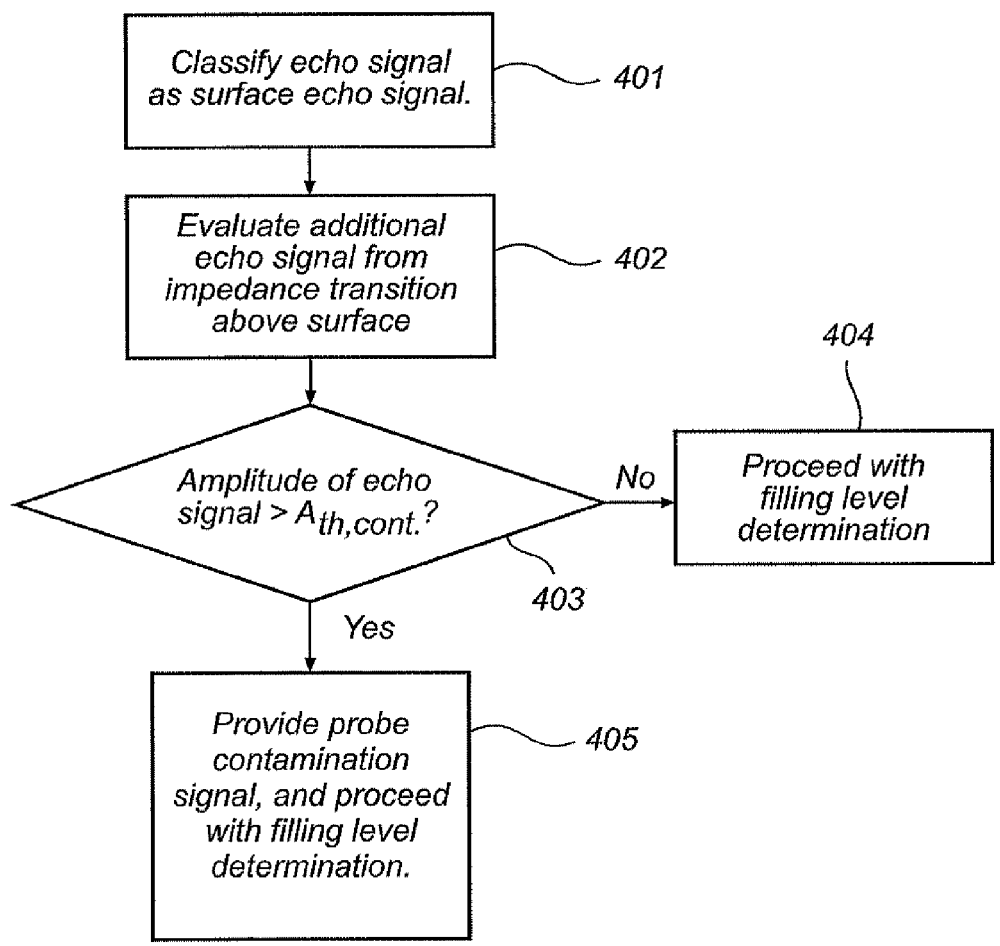
FIG. 4 is a flow-chart schematically illustrating a method according to a first embodiment of the present invention.

With reference to the schematic flow-chart in FIG. 4, an embodiment of a method according to the present invention, for enabling an improved measurement reliability by determining and indicating possible probe contamination will now be described.

In a first step 401, one of the echo signals $S_R$ returned by the probe and received by the transceiver 10 is classified as a surface echo signal resulting from reflection at the surface 7 of the product 6. This surface echo signal corresponds to the surface echo 46 in the echo profile 45 in FIG. 3.

The classification of the surface echo signal may, for example, be achieved by evaluating the echo profile 45 with respect to the surface echo threshold 51. For instance, the first returned echo signal having an amplitude above the surface echo threshold 51 may be classified as the surface echo signal.

In the subsequent step 402, additional echo signals resulting from reflections at impedance transitions located above the surface 7 are evaluated.

Each of these additional signals are, in the following step 403, compared with the probe contamination threshold 50. If none of the evaluated additional signals has an amplitude above the probe contamination threshold $A_{th,cont}$, the filling level determination proceeds in step 404.

If any of the evaluated additional signals has an amplitude above the probe contamination threshold $A_{th,cont}$, a signal indicative thereof is provided in step 405 to enable indication of possible probe contamination, and the filling level determination proceeds.

Through the above-described method, probe contamination, such as lumps 25, 26 adhered to the probe 3 can be located and indicated at an early stage, allowing for the user of the system to clean the probe or to disregard the echoes resulting from probe contamination by, for example, subtracting such echoes from the echo profile 45.

Situations may, however, occur when the radar level gauge system erroneously classifies a disturbance echo, such as a lump echo as the surface echo. In order to deal with such a situation, the radar level gauge system 1 in FIG. 1a may, according to an embodiment of the present invention, be equipped with an echo tracker module, which will be described below with reference to the schematic block diagram in FIG. 5.

Figure 5:
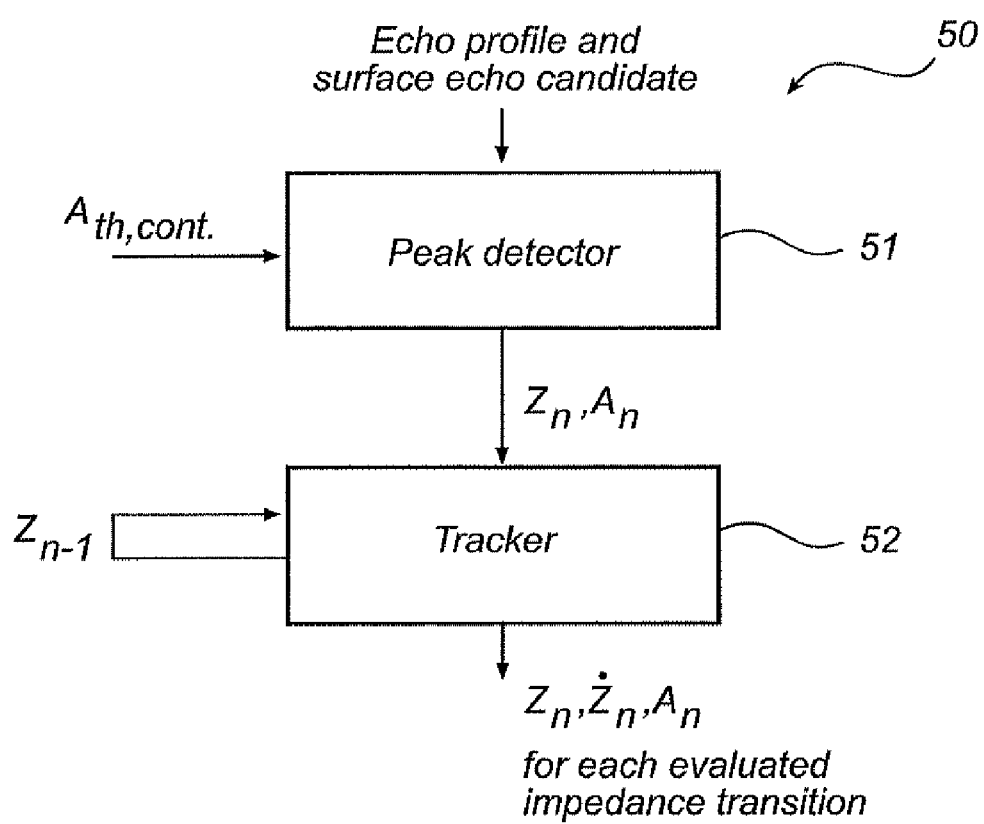
FIG. 5 is a block diagram schematically illustrating an echo tracker module comprised in an embodiment of the radar level gauge system according to the invention.

As can be seen in FIG. 5, the echo tracker module 50 comprises a peak detector block 51 and a tracker block 52. Based on input data in the form of a determined echo profile 45, a surface echo candidate 46, and the probe contamination threshold $A_{th,cont}$, the peak detector 51 outputs amplitudes $A_n$ and current locations $z_n$ along the probe 3 of each detected echo signal having an amplitude above the probe contamination threshold.

These current locations $z_n$ are input into the tracker 52, which compares the current locations with previous locations $z_{n-1}$ of the impedance transitions associated with the respective detected echo signals.

Based on this data, the tracker 52 determines the speed $\dot{z}_n$ along the probe of each impedance transition, and outputs amplitude $A_n$, position $z_n$ and speed $\dot{z}_n$ for each impedance transition.

Figure 6:
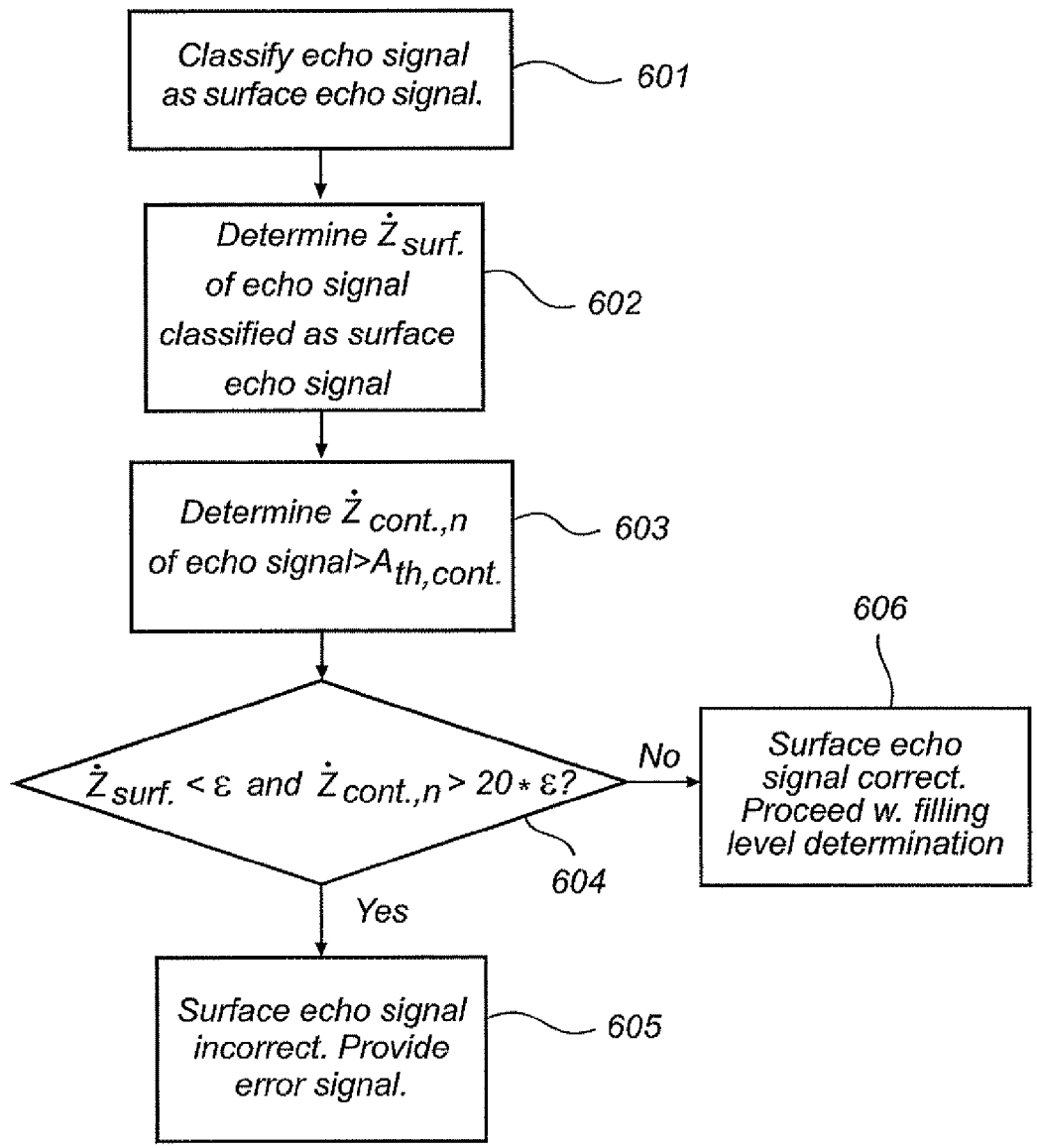
FIG. 6 is a flow-chart schematically illustrating a method according to a second embodiment of the present invention.

Using the above-described echo tracker module 50, or any other suitable means, an erroneous classification of the surface echo signal can be detected as will be described below with reference to the flow-chart in FIG. 6.

In a first step 601 an echo signal is classified as a surface echo signal. As described above in connection with FIG. 4, such a classification may, for example, be provided by comparison of the returned echo signals with a surface echo threshold.

In the subsequent step 602, the speed along the probe $\dot{z}_{surf}$ of the impedance transition believed to be the surface 7 of the product is determined. Thereafter, in step 603, the speed $\dot{z}_{cont,n}$ of each additional impedance transition resulting in an echo signal having an amplitude above the probe contamination threshold $A_{th,cont}$ is determined.

In the following step 604, the speed of each of the additional impedance transitions is compared with the speed of the impedance transition believed to be constituted by the surface. If the result of the comparison in step 604 is that the speed of the surface candidate is very low and that the speed of any additional impedance transition is significantly higher than the speed of the surface candidate, it is concluded that the surface candidate is in fact not the surface, and a measurement error signal is provided in step 605. Otherwise, it is determined that the surface candidate in fact is the surface 7 of the product 6 and the filling level determination proceeds in step 606.

According to what has been described so far, various aspects of the present invention enable filling level determination with improved reliability by monitoring echo signals that may result from reflection of transmitted signals by various impedance transitions, such as product residue adhered to the probe, and/or by evaluating whether the echo signal classified as a surface echo signal actually results from reflection of transmitted signals at the surface 7 of the product 6.

In the following, further aspects of the present invention will be described, with reference to the schematic flow-charts in FIGS. 7 and 8, according to which improved reliability is enabled by providing one or several reliability measure(s) that indicate the current process margin/process latitude.

Figure 7:
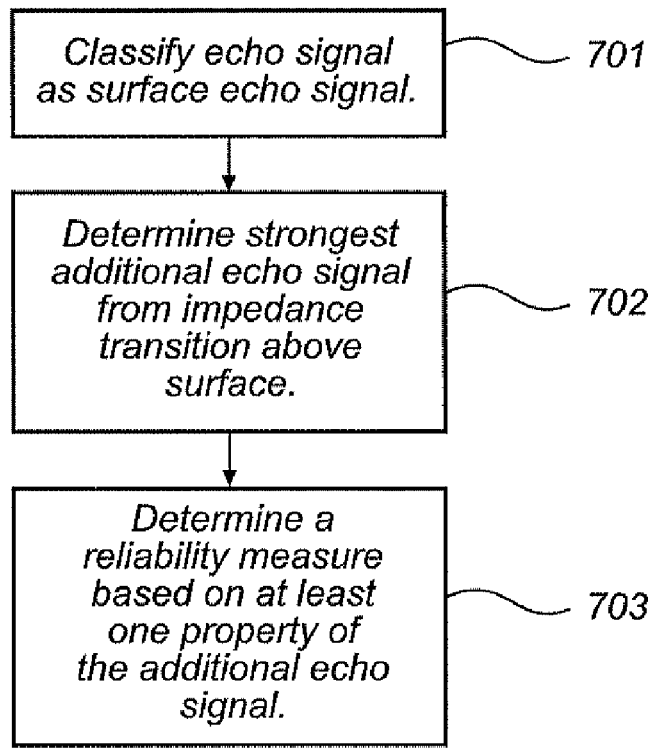
FIG. 7 is a flow-chart schematically illustrating a method according to a third embodiment of the present invention.

Referring first to the flow-chart in FIG. 7, an echo signal is, in a first step 701, classified as being a surface echo signal, resulting from reflection of transmitted electromagnetic signals at the surface 7 of the product 6 contained in the tank 5.

In a subsequent step 702, the strongest additional echo signal resulting from reflection of the transmitted signal at an impedance transition located above the surface 7 is determined. By "strongest" should generally be understood "having the largest amplitude".

In the following step 703, the additional echo signal determined in step 702 is used to determine a reliability measure for the filling level determination process.

One or several properties of the determined strongest additional signal above the surface may be used to derive the reliability measure.

According to one embodiment, the reliability measure may be determined to a value between 0 and 1 according to the following relation:

$$R_1 = 0 \text{ for } A_{surf} \leq A_{cont}$$
$$R_1 = \frac{A_{surf} = A_{cont}}{1.5 \cdot (A_{cont} + A_0) - A_{cont}} \text{ for } A_{cont} \leq A_{surf} \leq 1.5 \cdot (A_{cont} + A_0)$$
$$R_1 = 1 \text{ for } A_{surf} \geq 1.5 \cdot (A_{cont} + A_0)$$

where $A_{surf}$ is the amplitude of the surface echo signal, $A_{cont}$ is the amplitude of the additional signal, and AO is an offset value, that may typically essentially correspond to the noise level of the particular radar level gauge system.

It should be noted that the above relation represents an example only of how to obtain a relevant reliability measure, and that several other variations are readily apparent to a person skilled in the art.

According to another example, the reliability measure may reflect the relation between the strongest additional signal and the surface echo threshold. Such a reliability measure, $R_2$, may advantageously be determined analogously to the determination of $R_1$ as detailed above.

Figure 8:
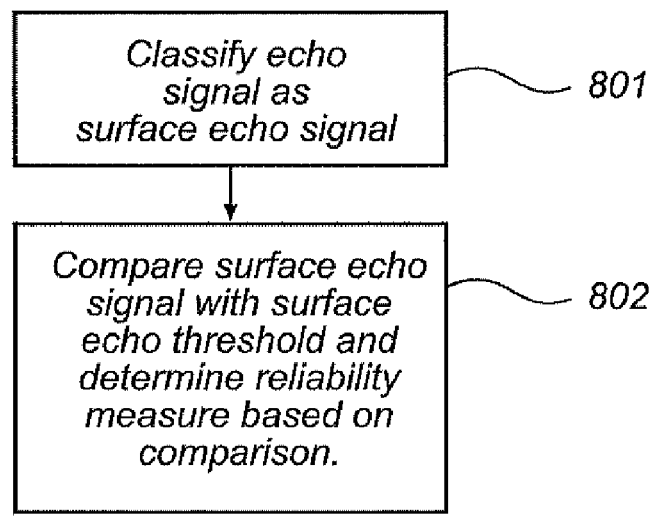
FIG. 8 is a flow-chart schematically illustrating a method according to a fourth embodiment of the present invention.

Turning now to the flow-chart in FIG. 8, an echo signal is, in a first step 801, classified as being a surface echo signal, resulting from reflection of transmitted electromagnetic signals at the surface 7 of the product 6 contained in the tank 5. In a subsequent step 802, the surface echo signal is compared with the surface echo threshold, and a reliability measure is determined based on this comparison.

Also this reliability measure, $R_3$, may advantageously be determined analogously to the determination of $R_1$ as detailed above.

Additionally, a total reliability measure may be based on any combination of $R_1$, $R_2$, $R_3$ and further reliability measures. In particular, the product of $R_2$ and $R_3$ has proven to be a valuable reliability measure.

According to one embodiment, the total reliability measure may be obtained by multiplying the determined reliability measures with each other. In case $R_1$, $R_2$, $R_3$ have been determined according to the relation given above, the resulting total reliability measure would be a figure between 0 and 1.

The person skilled in the art realizes that the present invention by no means is limited to the preferred embodiments described above. For example, the determination of the reliability measure may take place following installation to indicate if the installation was successful or if changes need to be made in order to yield sufficiently high quality measurements during operation. Moreover, the determination of the reliability measure may take place at suitable intervals during operation in order to monitor possible changes in the process margin.

What is claimed is:

1. A method for determination of a filling level of a product contained in a tank, comprising the steps of:
    generating and transmitting an electromagnetic signal;
    propagating said transmitted electromagnetic signal towards said product in the tank;
    receiving echo signals resulting from reflections at impedance transitions encountered by said transmitted electromagnetic signal;
    classifying one of said echo signals as a surface echo signal resulting from reflection at a surface of said product inside the tank;
    evaluating an additional echo signal;
    providing, if an amplitude of said additional echo signal is greater than a predetermined disturbance echo threshold, a signal indicative thereof; and
    determining said filling level based on said surface echo signal.

2. The method according to claim 1, wherein said signal is provided only if said additional echo signal results from reflection at an impedance transition located above a position associated with said surface echo signal.

3. The method according to claim 1, wherein a first received echo signal having an amplitude greater than a predetermined surface echo threshold is classified as said surface echo signal.

4. The method according to claim 3, wherein said disturbance echo threshold is a predetermined fraction of said surface echo threshold.

5. The method according to claim 1, further comprising the step of:
    determining a speed of an impedance transition, based on echo signals that result from reflection at said impedance transition and are received at different points in time.

6. The method according to claim 1, further comprising the steps of:
    determining a speed of a first impedance transition reflecting an echo signal having an amplitude greater than said disturbance echo threshold;
    determining a speed of a second impedance transition classified as said surface of the product inside the tank; and
    if said speed of the first impedance transition is higher than said speed of the second impedance transition, provide a signal indicative thereof.

7. The method according to claim 6, wherein said signal is provided only if the speed of the second impedance transition is lower than $10^{-5}$ m/s and the speed of the first impedance transition is higher than ten times $10^{-5}$ m/s.

8. The method according to claim 1, wherein said transmitted electromagnetic signal is propagated towards said product using a probe arranged to extend into said product and configured to guide electromagnetic signals.

9. The method according to claim 8, wherein said impedance transitions encountered by said transmitted electromagnetic signal are present along said probe, and said predetermined disturbance echo threshold is a probe contamination threshold.

10. The method according to claim 9, wherein said probe contamination threshold is related to a baseline representing electromagnetic signals guided towards said transceiver by the probe when uncontaminated.

11. A radar level gauge system, for determination of a filling level of a product contained in a tank, said radar level gauge system comprising:
   a transceiver for generating, transmitting and receiving electromagnetic signals;
   a propagation device connected to said transceiver and arranged to propagate a transmitted electromagnetic signal towards said product inside the tank, and to return echo signals resulting from reflections at impedance transitions encountered by said transmitted signal back to said transceiver; and
   processing circuitry connected to said transceiver and comprising:
      a signal classifier for classifying one of said echo signals as a surface echo signal resulting from reflection at a surface of said product inside the tank;
      a comparator for comparing an amplitude of an additional echo signal with a disturbance echo threshold;
      a signal generator for providing, if said amplitude is greater than said disturbance echo threshold, a signal indicative thereof; and
      determination circuitry for determining said filling level based on said surface echo signal.

12. The radar level gauge system according to claim 11, wherein said additional echo signal results from reflection at an impedance transition located above a position associated with said surface echo signal.

13. The radar level gauge system according to claim 11, wherein said echo signal classified as said surface echo signal is the first received echo signal having an amplitude greater than a predetermined surface echo threshold.

14. The radar level gauge system according to claim 13, wherein said probe contamination threshold is a predetermined fraction of said surface echo threshold.

15. The radar level gauge system according to claim 11, further comprising storage means for storing position data for an impedance transition based on echo signals that result from reflection at said impedance transition and are received at different points in time, thereby enabling determination of a speed of said impedance transition.

16. The radar level gauge system according to claim 11, wherein said propagation device is a probe arranged to extend into said product and configured to guide electromagnetic signals.

17. A method for determination of a filling level of a product contained in a tank, comprising the steps of:
   generating and transmitting an electromagnetic signal using a transceiver;
   propagating said transmitted electromagnetic signal towards said product in the tank;
   receiving echo signals resulting from reflections at impedance transitions encountered by said transmitted electromagnetic signal;
   classifying one of said received echo signals as a surface echo signal resulting from reflection at a surface of said product inside the tank;
   evaluating an additional echo signal resulting from reflection at an additional impedance transition located above a position associated with said surface echo signal;
   determining a reliability measure for said determination of the filling level based on at least one property of said additional echo signal; and
   determining said filling level based on said surface echo signal.

18. The method according to claim 17, wherein said additional echo signal has a larger amplitude than any other echo signal resulting from reflection at an impedance transition located above a position associated with said surface echo signal and has the same sign as said surface echo signal.

19. The method according to claim 17, wherein said reliability measure is based on a relation between said additional echo signal and said surface echo signal.

20. The method according to claim 19, wherein said reliability measure is based on a ratio between said surface echo signal and a sum of said additional echo signal and an offset value.

21. The method according to claim 17, wherein:
   said surface echo signal is classified as such by comparing said echo signals with a surface echo threshold; and
   said reliability measure is determined based on a relation between said additional echo signal and said surface echo threshold.

22. The method according to claim 21, wherein said reliability measure is based on a ratio between said surface echo threshold and a sum of said additional echo signal and an offset value.

23. The method according to claim 19, wherein said reliability measure is additionally based on a relation between said surface echo signal and said surface echo threshold.

24. The method according to claim 20, wherein said reliability measure is additionally based on a ratio between said surface echo signal and a sum of said surface echo threshold and an offset value.

25. The method according to claim 21, wherein said reliability measure is additionally based on a relation between said surface echo signal and said surface echo threshold.

26. The method according to claim 22, wherein said reliability measure is additionally based on a ratio between said surface echo signal and a sum of said surface echo threshold and an offset value.

27. The method according to claim 17, wherein said transmitted electromagnetic signal is propagated towards said product using a probe arranged to extend into said product and configured to guide electromagnetic signals.

28. A radar level gauge system, for determination of a filling level of a product contained in a tank, said radar level gauge system comprising:
   a transceiver for generating, transmitting and receiving electromagnetic signals;
   a propagation device connected to said transceiver and arranged to propagate a transmitted electromagnetic signal from said transceiver towards said product inside the tank, and to return echo signals resulting from reflections of said transmitted electromagnetic signal at impedance transitions encountered by said transmitted electromagnetic signal back to said transceiver; and
   processing circuitry connected to said transceiver and comprising:
      a signal classifier for classifying one of said echo signals as a surface echo signal resulting from reflection at a surface of said product inside the tank;
      an evaluator for evaluating an additional echo signal; and
      determination circuitry for determining a reliability measure for said determination of the filling level based on at least one property of said additional echo signal and for determining said filling level based on said surface echo signal.

29. The radar level gauge system according to claim 28, wherein said additional echo signal has a larger amplitude than any other echo signal resulting from reflection at an impedance transition located above a position associated with said surface echo signal and has the same sign as said surface echo signal.

30. The radar level gauge system according to claim 28, wherein said reliability measure is based on a relation between said additional echo signal and said surface echo signal.

31. The radar level gauge system according to claim 30, wherein said reliability measure is based on a ratio between said surface echo signal and a sum of said additional echo signal and an offset value.

32. The radar level gauge system according to claim 28, wherein:
   said surface echo signal is classified as such by comparing said echo signals with a surface echo threshold; and
   said reliability measure is determined based on a relation between said additional echo signal and said surface echo threshold.

33. The radar level gauge system according to claim 32, wherein said reliability measure is based on a ratio between said surface echo threshold and a sum of said additional echo signal and an offset value.

34. The radar level gauge system according to claim 30, wherein said reliability measure is additionally based on a relation between said surface echo signal and said surface echo threshold.

35. The radar level gauge system according to claim 31, wherein said reliability measure is additionally based on a ratio between said surface echo signal and a sum of said surface echo threshold and an offset value.

36. The radar level gauge system according to claim 32, wherein said reliability measure is additionally based on a relation between said surface echo signal and said surface echo threshold.

37. The radar level gauge system according to claim 32, wherein said reliability measure is additionally based on a ratio between said surface echo signal and a sum of said surface echo threshold and an offset value.

38. The radar level gauge system according to claim 28, wherein said transmitted electromagnetic signal is propagated towards said product using a probe arranged to extend into said product and configured to guide electromagnetic signals.

39. A method for determination of a filling level of a product contained in a tank, comprising the steps of:
   generating and transmitting an electromagnetic signal using a transceiver;
   propagating said transmitted electromagnetic signal towards said product in the tank;
   receiving echo signals resulting from reflections at impedance transitions encountered by said transmitted electromagnetic signal;
   classifying one of said received echo signals as a surface echo signal resulting from reflection at a surface of said product inside the tank;
   evaluating an additional echo signal resulting from reflection at an additional impedance transition located above a position associated with said surface echo signal;
   determining a reliability measure for said determination of the filling level based on a relation between said surface echo signal and said surface echo threshold; and
   determining said filling level based on said surface echo signal.

40. The method according to claim 39, wherein said transmitted electromagnetic signal is propagated towards said product using a probe arranged to extend into said product and configured to guide electromagnetic signals.

* * * * *

UNITED STATES PATENT AND TRADEMARK OFFICE
CERTIFICATE OF CORRECTION

| | | |
|---|---|---|
| PATENT NO. | : 7,551,122 B1 | Page 1 of 1 |
| APPLICATION NO. | : 11/951621 | |
| DATED | : June 23, 2009 | |
| INVENTOR(S) | : Delin et al. | |

It is certified that error appears in the above-identified patent and that said Letters Patent is hereby corrected as shown below:

Title Page, item (73) "Gothenburg (SE)" should be changed to --Goteborg (SE)--

Signed and Sealed this

Ninth Day of March, 2010

David J. Kappos
*Director of the United States Patent and Trademark Office*